(12) United States Patent
Patil et al.

(10) Patent No.: US 11,732,176 B2
(45) Date of Patent: Aug. 22, 2023

(54) LIQUID PLUG FOR WELLBORE OPERATIONS

(71) Applicant: Halliburton Energy Services, Inc., Houston, TX (US)

(72) Inventors: Sandip Prabhakar Patil, Pune (IN); Ganesh Shriniwas Pangu, Pune (IN); Venkata Gopala Rao Palla, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 17/447,856

(22) Filed: Sep. 16, 2021

(65) Prior Publication Data

US 2023/0082853 A1 Mar. 16, 2023

(51) Int. Cl.
*E21B 33/16* (2006.01)
*C09K 8/42* (2006.01)
*E21B 33/13* (2006.01)

(52) U.S. Cl.
CPC .............. *C09K 8/426* (2013.01); *C09K 8/424* (2013.01); *E21B 33/13* (2013.01); *E21B 33/16* (2013.01)

(58) Field of Classification Search
CPC ........ E21B 33/13; E21B 33/16; E21B 33/165; E21B 33/167; C09K 8/426; C09K 8/424
See application file for complete search history.

(56) References Cited

U.S. PATENT DOCUMENTS

| | | | |
|---|---|---|---|
| 4,304,300 A | 12/1981 | Watson | |
| 5,346,011 A | 9/1994 | Onan et al. | |
| 8,685,903 B2* | 4/2014 | Ravi | C09K 8/473 106/812 |
| 9,102,865 B2 | 8/2015 | Fox | |
| 9,470,051 B2 | 10/2016 | Daccord | |
| 9,644,133 B2* | 5/2017 | Michaux | E21B 33/14 |
| 2008/0060811 A1 | 3/2008 | Bour et al. | |
| 2020/0002596 A1 | 1/2020 | Sodhi et al. | |
| 2020/0369938 A1 | 11/2020 | Linscombe | |

FOREIGN PATENT DOCUMENTS

| | | |
|---|---|---|
| WO | 2008032049 A1 | 3/2008 |
| WO | 2017070016 A1 | 4/2017 |

* cited by examiner

*Primary Examiner* — Catherine Loikith
(74) *Attorney, Agent, or Firm* — Sheri Higgins; Sheri Higgins Law, PLLC

(57) ABSTRACT

A method of treating a subterranean formation can include: introducing a first fluid into a wellbore penetrating the subterranean formation; introducing a second fluid into the wellbore after introduction of the first fluid, wherein the second fluid comprises: a base fluid comprising water; a viscosifier; and a stabilizer, and wherein the second fluid has a rheological 3-rpm dial reading to 300-rpm dial reading ratio in the range of 1:1 to 1:3; and introducing a third fluid into the wellbore after introduction of the second fluid, wherein the second fluid inhibits or prevents the first fluid from mixing with the third fluid. The second fluid can be a liquid plug that substantially inhibits or prevents the first fluid from mixing with the third fluid. The first fluid can be a drilling mud or spacer fluid. The third fluid can be a spacer fluid or a cement composition.

20 Claims, 3 Drawing Sheets

LIQUID PLUG FOR WELLBORE OPERATIONS

TECHNICAL FIELD

Wellbore operations involve introducing a series of fluids into the wellbore; for example, a drilling mud, spacer fluid, or cement composition. A liquid plug can be introduced into the wellbore between two different types of fluids to prevent or inhibit intermixing of the two fluids.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
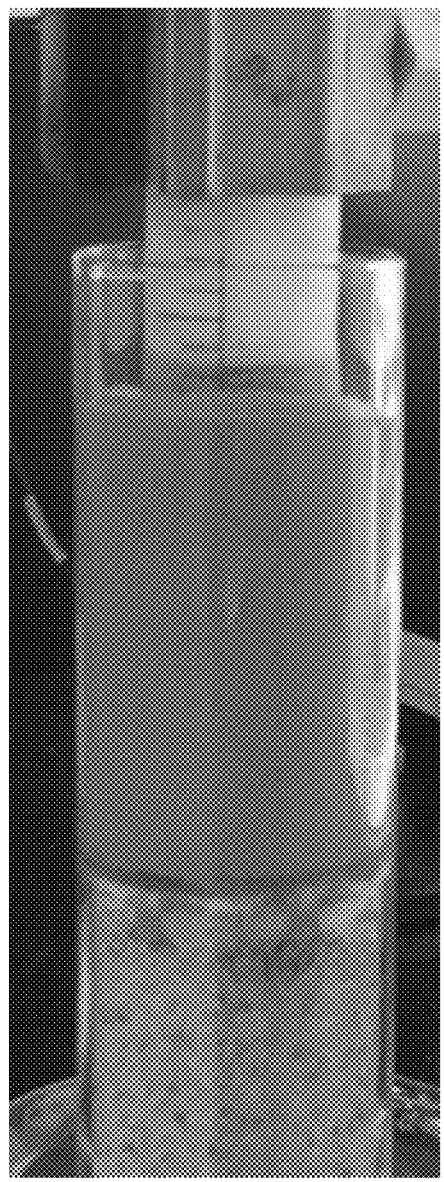
FIG. 1 is a photograph showing a liquid plug in a tube.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During drilling operations, a wellbore is formed using a drill bit. A drill string can be used to aid the drill bit in drilling through a subterranean formation to form the wellbore. The drill string can include a drilling pipe through which a drilling fluid or drilling mud is pumped. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A spacer fluid can be introduced into the wellbore after the drilling fluid and before the cement composition. The spacer fluid can flush residual drilling fluid that may remain in parts of the wellbore or face of the subterranean formation to help ensure better bonding of the cement composition to the interface.

During well completion, it is common to introduce a cement composition into an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing. As used herein, a "cement composition" is a mixture of at least cement and water. A cement composition can include additives. As used herein, the term "cement" means an initially dry substance that develops compressive strength or sets in the presence of water.

During introduction into the wellbore, it is desirable to keep different fluids from intermixing. For example, a spacer fluid should not mix with a drilling fluid in order for the spacer fluid to function properly. By way of another example, a cement composition should not mix with a spacer fluid because the properties of the cement composition and concentrations of additives in the cement composition could be altered from intermixing. Mechanical plugs or other mechanical devices can be used as a barrier to keep different fluids separated and not intermix. For example, a bottom plug can be run into a tubing string with a fluid pumped after the bottom plug. A top plug can be run into the tubing string after the fluid. However, mechanical plugs are not capable of entering an annulus such as an annulus located between the outside of the tubing string and the wall of the wellbore. Therefore, once a fluid enters the annulus, there is nothing to prevent intermixing of different fluids within the annulus.

Additionally, during reverse cementing operations in which a cement composition is pumped into the annulus directly, as opposed to being pumped through a tubing string first and then into the annulus from the bottom of the tubing string, it is not possible to use a mechanical device to separate the fluids and intermixing is very likely to occur.

Thus, there is a need to provide separation of fluids in an annulus and to prevent or inhibit intermixing. It has been discovered that a fluid can be introduced between two other fluids in a wellbore and inhibits or prevents intermixing of the two other fluids. The fluid can exhibit high shear thinning behavior whereby the fluid can flow like a solid plug at low pump rates and shear to exhibit more liquid characteristics at higher pump rates.

Fluids can be tested in a laboratory with test fluids. If any laboratory test (e.g., 10-minute gel strength) requires the step of mixing, then the test fluid is mixed according to the following procedure. The water is added to a mixing container and the container is then placed on a mixer base. The motor of the base is then turned on and maintained at 4,000 revolutions per minute "rpm" (+/−200 rpm). Any ingredients are added to the container. The ingredients can be added to the water in the mixing container at different times during the mixing. After all the ingredients have been added to the water in the container, a cover is then placed on the container, and the test fluid is mixed at 4,000 rpm (+/−200 rpm) for 10 minutes (min.).

It is also to be understood that if any laboratory test requires the test be performed at a specified temperature and possibly a specified pressure, then the temperature and pressure of the test fluid is ramped up to the specified temperature and pressure after being mixed at ambient temperature and pressure. For example, the test fluid can be mixed at 71° F. (22° C.) and 1 atm (0.1 MPa) and then placed into the testing apparatus and the temperature of the test fluid can be ramped up to the specified temperature. As used herein, the rate of ramping up the temperature is in the range of about 2° C./min to about 3° C./min. The purpose of the specific rate of temperature ramping during measurement is to simulate the temperature profile experienced by the test fluid as it is being pumped downhole. After the test fluid is ramped up to the specified temperature and possibly specified pressure, the test fluid is maintained at that temperature and pressure for the duration of the testing.

A fluid can have a desired viscosity. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)) or expressed in units of Pascal-second (Pa-s). However, because a material that has a viscosity of 1 P is a relatively viscous material, viscosity is more commonly expressed in units of centipoise (cP), which is 1/100 P.

A fluid can have a desired rheology profile. Rheology is a measure of how a material deforms and flows. As used herein, the "rheology" of a fluid is measured as follows. The fluid is mixed. The fluid is placed into the test cell of a rotational viscometer, such as a FANN® Model 35 viscometer, fitted with a FANN® yield stress adaptor ("FYSA") attachment and an F1 spring number. The fluid is tested at the specified temperature and ambient pressure, about 1 atm (0.1 MPa). Rheology readings are taken at multiple revolutions per minute "rpm," for example, at 3, 6, 30, 60, 100, 200, and 300. Rheology readings taken at various revolutions per minute can be referred to by the corresponding dial reading. For example, a rheology reading of a composition taken at 3 rpm can be referred to as the "rheological 3-rpm dial reading" for that composition.

A fluid can be a gel. A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10-minute gel strength greater than 30 lb/100 ft$^2$ (1,436 Pa) will become a gel. Alternatively, generally, a substance with a 10-minute gel strength less than 30 lb/100 ft$^2$ (1,436 Pa) will remain in a fluid state. A breakable gel is a fluid that acts like a gel at low shear rates, for example in the range of 0 to 30 rpm, thus exhibiting good suspending properties but can be broken to exhibit liquid characteristics at higher shear rates.

As used herein, the "10-min gel strength" of a fluid is measured as follows. After the rheology testing of the fluid is performed, the fluid is allowed to sit in the test cell for 10 min. The motor of the viscometer is then started at 3 rpm. The maximum deflection on the dial reading corresponds to the gel strength at 10 min. To convert the dial reading to Pascal (Pa), the dial reading is multiplied by 0.7 and then multiplied by 2.088 to convert Pa to lb/100 ft$^2$.

A method of treating a subterranean formation can include: introducing a first fluid into a wellbore penetrating the subterranean formation; introducing a second fluid into the wellbore after introduction of the first fluid, wherein the second fluid comprises: a base fluid comprising water; a viscosifier, wherein the viscosifier forms hydrogen bonds with the water; and a stabilizer; and introducing a third fluid into the wellbore after introduction of the second fluid, wherein the second fluid inhibits or prevents the first fluid from mixing with the third fluid.

As used herein, any reference to the unit "gallons" means U.S. gallons.

A subterranean formation can be penetrated by a wellbore. A tubing string can be installed within the wellbore. An annulus can be located between the outside of the tubing string and the wall of the wellbore in an open hole wellbore or between the outside of the tubing string and the inside of a casing string in a cased wellbore.

The first fluid can be introduced into the wellbore. The first fluid can be a drilling fluid or a spacer fluid. The first fluid can be introduced into the wellbore by pumping the first fluid via pumping equipment located at a wellhead into the tubing string. The first fluid can flow through the tubing string, out of the bottom of the tubing string, and up towards the wellhead in the annulus. The first fluid can have a base fluid and additives selected for the design of the first fluid (e.g., a drilling fluid or a spacer fluid).

The second fluid can be introduced into the wellbore after the first fluid. The second fluid can include a base fluid that comprises water. The water can be in a concentration in the range of 60% to 98% of the base fluid. The base fluid can also include a hydrocarbon liquid, for example as an internal phase of a base fluid emulsion with water as the external phase. The water can be selected from the group consisting of freshwater, brackish water, and saltwater, in any combination thereof in any proportion.

The second fluid can include a viscosifier. The viscosifier can be a clay. The clay can be natural clay or synthetic clay. The clay can be selected from the group consisting of hectorite, bentonite, attapulgite, sepiolite, and combinations thereof. The clay can be hydrophilic or hygroscopic. Hygroscopicity is the ability of a substance to attract and hold water molecules from the surrounding environment through either absorption or adsorption, with the substance becoming physically changed, for example by swelling, as water molecules become suspended between the substance's molecules in the process. The clay can swell in the presence of water and become a gel. The clay can form hydrogen bonds with the water molecules. The viscosifier can also include a combination of clay and another compound. The other compound can be a polysaccharide, cellulose, cellulose derivatives, or synthetic polymeric viscosifier, for example diutan gum. The viscosifier can be in a concentration in the range of 0.01 to 5 weight by weight (w/w) of the base fluid. The viscosifier can be in a concentration in the range of 0.02 to 4 w/w of the base fluid.

The second fluid can include a stabilizer. The stabilizer can stabilize the viscosifier/water gel. The stabilizer can increase the 10 min gel strength of the second fluid compared to a second fluid having the same composition as the second fluid except without the stabilizer. Without being limited by theory, it is believed that the stabilizer can become suspended within bonding spaces of the viscosifier and the water and helps stabilize the viscosifier. Additionally, it is believed that the hydrogen bonds formed from the viscosifier and water without the stabilizer are easier to break at the same shear force compared to a fluid with the stabilizer added.

The stabilizer can be selected from the group consisting of barium sulfate, iron (III) oxide, haussmannite, silica, and combinations thereof. The stabilizer can be in a concentration in the range of 0.1 to 40 weight by weight (w/w) of the base fluid. The stabilizer can be in a concentration in the range of 0.4 to 35 w/w of the base fluid.

The third fluid can be introduced into the wellbore after introduction of the second fluid. The third fluid can be a spacer fluid or a cement composition. The third fluid can be introduced into the tubing string. If the third fluid is introduced into the tubing string, then the second fluid can be introduced into the tubing string. By way of example, the first fluid can be a drilling fluid introduced into the tubing string, the second fluid can be introduced into the tubing string, and the third fluid can be a spacer fluid introduced into the tubing string. By way of another example, the first fluid can be a spacer fluid introduced into the tubing string, the second fluid can be introduced into the tubing string, and the third fluid can be a cement composition introduced into the tubing string.

The third fluid can be introduced into an annulus of the wellbore. If the third fluid is introduced into the annulus, then the second fluid can be introduced into the annulus. By way of example, the first fluid can be a spacer fluid introduced into the tubing string, the second fluid can be introduced into the annulus, and the third fluid can be a cement composition introduced into the annulus (also known as reverse cementing).

According to any of the embodiments, the second fluid can be introduced into the wellbore more than once at different times and optionally into different portions of the wellbore (e.g., the tubing string or the annulus). By way of a first example, a drilling fluid can be introduced into the wellbore, the second fluid can be introduced after the drilling fluid, a spacer fluid can be introduced after the second fluid, the second fluid can subsequently be introduced after the spacer fluid, and a cement composition can be introduced at the end. In this example, the second fluid is introduced twice and between different types of fluids—namely between the drilling fluid and spacer fluid, and between the spacer fluid and the cement composition. It is to be understood that the second fluid can be introduced as many times as desired in order to separate two or more different types of fluids.

The second fluid inhibits or prevents the first fluid from mixing with the third fluid. The second fluid can behave more like a solid than a liquid when being introduced into the wellbore, which will prevent or substantially inhibit intermixing of the first and third fluids. The second fluid can be a breakable gel. The second fluid can exhibit gel characteristics at low pump rates, for example pump rates of 1 to 3 barrels per minute (bpm). As used herein, "gel characteristics" means the fluid does not easily flow, shearing stresses below a certain value fail to produce permanent deformation, and behaves more like a solid than a liquid. At pump rates above 3 bpm for example, a sufficient number of hydrogen bonds formed between the viscosifier and the water of the base fluid can break, and the second fluid exhibits behaviors more like a liquid than a gel. This can be useful when the second fluid encounters wellbore equipment, such as a mule shoe, such that the second fluid can be pumped past the wellbore equipment.

The second fluid can have a desired viscosity. The second fluid can have a viscosity in the range of 10 to 500 cP. The viscosity can be selected such that the second fluid inhibits or prevents the first fluid from mixing with the third fluid. The concentration of the viscosifier can be selected such that the second fluid has the desired viscosity.

The second fluid can have a desired 10-min gel strength. The desired 10-min gel strength can be at least 30 lb/100 ft$^2$. The desired 10-min gel strength can also be at least 50 lb/100 ft$^2$. The desired 10-min gel strength can be in the range of 30 to 150 lb/100 ft$^2$. The gel strength can be selected such that the second fluid inhibits or prevents the first fluid from mixing with the third fluid. In order to inhibit or prevent the first fluid from mixing with the third fluid, the gel strength may need to be increased based on the density of the first or third fluids. By way of example, a cement composition as the third fluid that has a density of 4 pounds per gallon (ppg) may be prevented from intermixing with the first fluid when the second fluid has a 10 min gel strength of 50 lb/100 ft$^2$; whereas a cement composition that has a density of 15 ppg may require the 10 min gel strength of the second fluid to be increased to 90 lb/100 ft$^2$ in order to prevent intermixing.

The second fluid can have a desired rheology. The second fluid can have a dial reading of at least 10 at 3 rpm with an FYSA attachment. The second fluid can have a dial reading in the range of 10 to 60 at 3 rpm. The second fluid can have a rheology value of at least 25 at 300 rpm. The second fluid can have a dial reading in the range of 10 to 180 at 300 rpm with an FYSA attachment. A lower dial reading at 3 or 300 rpm can indicate the viscosity of the second fluid is lower compared to a higher dial reading. The selection of the viscosifier and the concentrations of the viscosifier and the stabilizer can be selected such that the second fluid has the desired rheology.

The second fluid can have a desired rheology profile. The rheology profile can also be expressed in terms of the 3-rpm dial reading and the 300-rpm dial reading. According to any of the embodiments, the ratio of the 3-rpm dial reading and the 300-rpm dial reading is in the range of 1:1 to 1:3. By way of example, if the 3-rpm value is 30, then the 300-rpm value can be in the range of 30 to 90. A 300-rpm reading that is closer to the 3-rpm reading (e.g., a ratio of 1:1.2) can mean that the second fluid behaves more like a liquid at shear rates corresponding to 300 rpm and behaves more like a solid gel at shear rates corresponding to 3 rpm.

Figure 2:
FIG. 2 is a photograph showing a sample test fluid in a tube.
Figure 3:
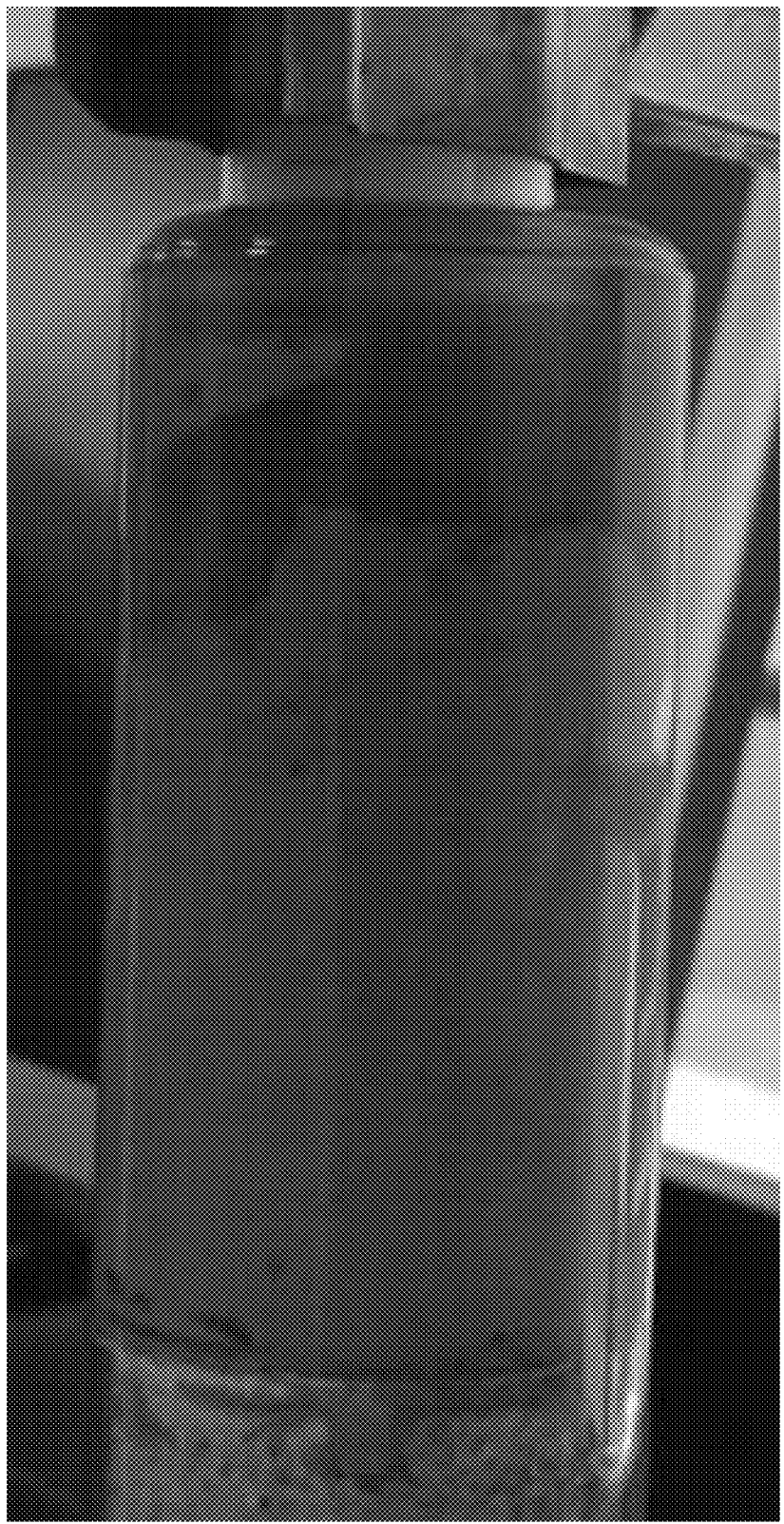
FIG. 3 is a photograph showing a liquid plug displacing the sample test fluid of FIG. 2.

FIG. 1 is a photograph of a test second fluid in a representative annulus. The formulation of the test second fluid is listed below in Table 1 as composition #1. As can be seen in FIG. 1, the test second fluid is very thick and dense. FIG. 2 is a photograph of a test first fluid after placement into the representative annulus. FIG. 3 is a subsequent photograph of FIG. 2 after a test second fluid is placed within the annulus after the test first fluid, wherein the test second fluid is injected through a representative tubing string and flows upwards within the annulus. As can be seen in the photograph of FIG. 3, the test second fluid pushes the test first fluid up towards the top of the tube and completely displaces the test first fluid with very little intermixing of the fluids. This shows that the test second fluid can function as a liquid plug in which the test second fluid can physically separate the test first fluid from a third fluid that could be introduced after the test second fluid.

The second fluid can have a density in the range of 9 to 20 pounds per gallons (ppg). The density of the second fluid can be selected such that the ability of the second fluid to inhibit or prevent intermixing of the first fluid and the third fluid is increased. By way of example, the density of the second fluid can be selected such that the density is between the density of the first and third fluids. Accordingly, if the density of the first fluid is 5 ppg and the density of the third fluid is 15 ppg, then the density of the second fluid can be in the range of 6 to 14 ppg. It is to be understood that a density hierarchy can be helpful to reduce intermixing of the first and third fluids, but it is the gel strength, rheology, and gelling characteristics of the second fluid that is mostly or wholly responsible for inhibiting or preventing intermixing of the first and third fluids. Therefore, the second fluid can function effectively as a liquid plug even when a density hierarchy is not possible. The second fluid can further include other additives, such as weighting agents, agents that reduce density, surfactants, etc.

An embodiment of the present disclosure is a method of treating a subterranean formation comprising: introducing a first fluid into a wellbore penetrating the subterranean formation; introducing a second fluid into the wellbore after introduction of the first fluid, wherein the second fluid comprises: a base fluid comprising water; a viscosifier; and a stabilizer, and wherein the second fluid has a rheological 3-rpm dial reading to 300-rpm dial reading ratio in the range of 1:1 to 1:3; and introducing a third fluid into the wellbore after introduction of the second fluid, wherein the second fluid inhibits or prevents the first fluid from mixing with the third fluid. Optionally, the method further comprises wherein the first fluid is a drilling fluid or a spacer fluid. Optionally, the method further comprises wherein the first fluid is introduced into a tubing string located within the wellbore. Optionally, the method further comprises wherein the viscosifier comprises a natural clay or synthetic clay. Optionally, the method further comprises wherein the natural or synthetic clay is selected from the group consisting of hectorite, bentonite, attapulgite, sepiolite, and combinations thereof. Optionally, the method further comprises wherein the viscosifier further comprises a polysaccharide, cellulose, cellulose derivatives, or synthetic polymeric viscosifier. Optionally, the method further comprises wherein the viscosifier is in a concentration in the range of 0.02 to 4 weight by weight of the base fluid. Optionally, the method further comprises wherein the stabilizer increases a 10-minute gel strength of the second fluid compared to a second fluid having the same composition as the second fluid except without the stabilizer. Optionally, the method further comprises wherein the stabilizer is selected from the group consisting of barium sulfate, iron (III) oxide, haussmannite, silica, and combinations thereof. Optionally, the method further comprises wherein the stabilizer is in a concentration in the range of 0.1 to 5 weight by weight of the base fluid. Optionally, the method further comprises wherein the second fluid has a viscosity in the range of 10 to 500 cP. Optionally, the method further comprises wherein the second fluid has a 10-minute gel strength of at least 30 lb/100 ft$^2$. Optionally, the method further comprises wherein the second fluid has a 10-minute gel strength in the range of 30 to 150 lb/100 ft$^2$. Optionally, the method further comprises wherein the second fluid has a rheological 3-rpm dial reading in the range of 25 to 60. Optionally, the method further comprises wherein the second fluid has a rheological 300-rpm dial reading in the range of 25 to 180. Optionally, the method further comprises wherein the second fluid has a rheological 3-rpm dial reading to 300-rpm dial reading ratio in the range of 1:1 to 1:2. Optionally, the method further comprises wherein the third fluid is a spacer fluid or a cement composition, wherein the second fluid is introduced into a tubing string that is located within the wellbore, and wherein the third fluid is introduced into the tubing string. Optionally, the method further comprises a tubing string located within the wellbore and an annulus formed between the outside of the tubing string and a wall of the wellbore or an inside of a casing string, wherein the second fluid is introduced into the annulus. Optionally, the method further comprises wherein the third fluid is a cement composition, and wherein the third fluid is introduced into the annulus. Optionally, the method further comprises wherein the second fluid has a density greater than a density of the first fluid, and wherein the density of the second fluid is less than a density of the third fluid.

Examples

To facilitate a better understanding of the various embodiments, the following examples are given.

For Table 1 and FIGS. 1-3, two different fluids were prepared as a test second fluid as a liquid plug. Composition #1 contained 3.5 grams (g) of a synthetic hectorite clay as the viscosifier; 50 g of barium sulfate as the stabilizer; and 100 g of tap water. Composition #2 contained a blend of 3 g of diutan gum and 21 g of sepiolite clay as the viscosifier; 175 g of barium sulfate as the stabilizer; and 350 g of tap water. The test fluids were mixed and tested according to the specifics for each test in the Detailed Description section above.

Table 1 lists the rheology of the test fluids. As can be seen in Table 1, composition #1 had an excellent rheology profile. The dial reading at 300 rpm was +6 of the 3-rpm reading. This indicates that composition #1 would function very effectively as a liquid plug to inhibit or prevent intermixing of fluids. Composition #2 also had a good rheology profile. This indicates that the viscosifier and the stabilizer, as well as the concentration of each, can be selected to achieve desired properties of the second fluid.

TABLE 1

| RPM | Composition #1 | Composition #2 |
|---|---|---|
| 3 | 45 | 30 |
| 6 | 47 | 32 |
| 30 | 48 | 41 |
| 60 | 49 | 45 |
| 100 | 49 | 47 |

TABLE 1-continued

| RPM | Composition #1 | Composition #2 |
|---|---|---|
| 200 | 50 | 52 |
| 300 | 51 | 55 |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole, such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
    introducing a first fluid into a wellbore penetrating the subterranean formation;
    introducing a second fluid into the wellbore after introduction of the first fluid, wherein the second fluid comprises:
    a base fluid comprising water;
    a viscosifier; and
    a stabilizer, and
    wherein the second fluid has a rheological 3-rpm dial reading to 300-rpm dial reading ratio in a range of 1:1 to 1:3 at a temperature of 71° F. and a pressure of 1 atm; and
    introducing a third fluid into the wellbore after introduction of the second fluid, wherein the second fluid inhibits or prevents the first fluid from mixing with the third fluid.

2. The method according to claim 1, wherein the first fluid is a drilling fluid or a spacer fluid.

3. The method according to claim 2, wherein the first fluid is introduced into a tubing string located within the wellbore.

4. The method according to claim 1, wherein the viscosifier comprises a natural clay or synthetic clay.

5. The method according to claim 4, wherein the natural or synthetic clay is selected from the group consisting of hectorite, bentonite, attapulgite, sepiolite, and combinations thereof.

6. The method according to claim 5, wherein the viscosifier further comprises a polysaccharide, cellulose, cellulose derivatives, or synthetic polymeric viscosifier.

7. The method according to claim 1, wherein the viscosifier is in a concentration in a range of 0.02 to 4 weight percent of the base fluid.

8. The method according to claim 1, wherein the stabilizer increases a 10-minute gel strength of the second fluid compared to a second fluid having the same composition as the second fluid except without the stabilizer.

9. The method according to claim 1, wherein the stabilizer is selected from the group consisting of barium sulfate, iron (III) oxide, haussmannite, silica, and combinations thereof.

10. The method according to claim 1, wherein the stabilizer is in a concentration in a range of 0.1 to 5 weight percent of the base fluid.

11. The method according to claim 1, wherein the second fluid has a viscosity in a range of 10 to 500 cP.

12. The method according to claim 1, wherein the second fluid has a 10-minute gel strength of at least 30 lb/100 ft$^2$.

13. The method according to claim 1, wherein the second fluid has a 10-minute gel strength in a range of 30 to 150 lb/100 ft$^2$.

14. The method according to claim 1, wherein the second fluid has a rheological 3-rpm dial reading in a range of 25 to 60.

15. The method according to claim 14, wherein the second fluid has a rheological 300-rpm dial reading in a range of 25 to 180.

16. The method according to claim 1, wherein the second fluid has a rheological 3-rpm dial reading to 300-rpm dial reading ratio in a range of 1:1 to 1:2.

17. The method according to claim 1, wherein the third fluid is a spacer fluid or a cement composition, wherein the second fluid is introduced into a tubing string that is located within the wellbore, and wherein the third fluid is introduced into the tubing string.

18. The method according to claim 1, further comprising a tubing string located within the wellbore and an annulus formed between an outside of the tubing string and a wall of the wellbore or an inside of a casing string, wherein the second fluid is introduced into the annulus.

19. The method according to claim 18, wherein the third fluid is a cement composition, and wherein the third fluid is introduced into the annulus.

20. The method according to claim 1, wherein the second fluid has a density greater than a density of the first fluid, and wherein the density of the second fluid is less than a density of the third fluid.

* * * * *